United States Patent
Litwinski et al.

(10) Patent No.: US 6,865,919 B2
(45) Date of Patent: Mar. 15, 2005

(54) METHOD AND APPARATUS FOR PRODUCING A REFINED GRAIN STRUCTURE

(75) Inventors: Edward Litwinski, Mission Viejo, CA (US); Steven G. Keener, Trabuco Canyon, CA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/606,564

(22) Filed: Jun. 26, 2003

(65) Prior Publication Data

US 2004/0000576 A1 Jan. 1, 2004

Related U.S. Application Data

(62) Division of application No. 10/145,009, filed on May 14, 2002, now Pat. No. 6,726,085.

(51) Int. Cl.[7] ............................................. B21C 23/00
(52) U.S. Cl. ........................ 72/256; 72/253.1; 72/259; 72/264
(58) Field of Search .............................. 72/253.1, 256, 72/259, 264, 271; 164/133, 134

(56) References Cited

U.S. PATENT DOCUMENTS

| | | | |
|---|---|---|---|
| 4,063,676 A | 12/1977 | Lilly | |
| 4,260,094 A | 4/1981 | Stroo | |
| 4,960,163 A * | 10/1990 | Fang et al. | 164/459 |
| 5,438,858 A * | 8/1995 | Friedrichs | 72/260 |
| 5,460,317 A | 10/1995 | Thomas et al. | |
| 5,611,479 A | 3/1997 | Rosen | |
| 5,713,507 A | 2/1998 | Holt et al. | |
| 5,813,592 A | 9/1998 | Midling et al. | |
| 5,829,664 A | 11/1998 | Spinella et al. | |
| 5,893,507 A | 4/1999 | Ding et al. | |
| 6,248,277 B1 * | 6/2001 | Friedrichs | 264/167 |
| 6,640,879 B2 * | 11/2003 | Richard et al. | 164/309 |
| 6,726,085 B2 * | 4/2004 | Litwinski et al. | 228/112.1 |

* cited by examiner

Primary Examiner—Ed Tolan
(74) Attorney, Agent, or Firm—Alston & Bird LLP

(57) ABSTRACT

The apparatus for operating on a workpiece includes a die defining first and second apertures and an interior therebetween. The first aperture and the interior of the die are structured to receive the workpiece. The interior of the die can be structured to shape the workpiece into a predetermined configuration. The apparatus includes at least one rotatable pin extending at least partially into the interior of the die. The pin is structured to at least partially stir the workpiece as the workpiece moves through the interior of the die to thereby refine the grain structure of the workpiece.

20 Claims, 11 Drawing Sheets

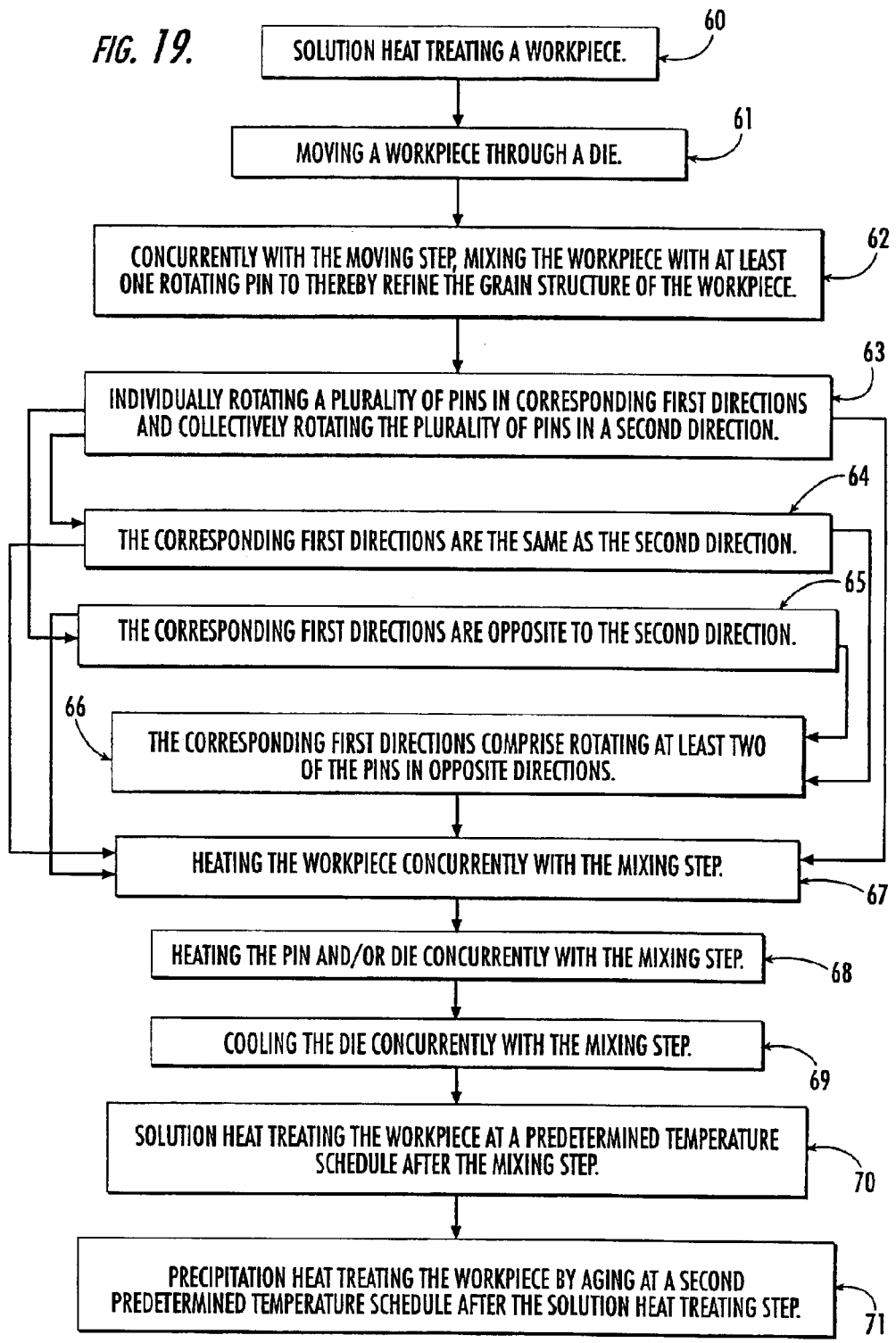

METHOD AND APPARATUS FOR PRODUCING A REFINED GRAIN STRUCTURE

CROSS REFERENCE TO RELATED APPLICATIONS

This application is a divisional of U.S. application Ser. No. 10/145,009, filed May 14, 2002 U.S. Pat. No. 6,726,085, which is hereby incorporated herein in its entirety by reference.

FIELD OF THE INVENTION

The present invention relates to the grain structure of workpieces formed from metals and metal alloys and, more particularly, relates to an apparatus and an associated method for producing a refined grain structure in a workpiece.

BACKGROUND OF THE INVENTION

Structural assemblies, such as those in the aerospace industry, are often constructed by joining structural members together. During use, these structural assemblies can be subjected to a variety of environmental conditions, temperature variations, load variations, severe acoustic and vibration environments, all of which create mechanical and thermal stresses. The reliability and performance of the structural assemblies under these stresses depends in large part on the material properties of the constituent structural members and any weld joints between the members.

It is commonly recognized that the grain structure of structural members can have an adverse effect on the material properties of the structural members and any weld joints between the members. For example, the grain structure typically associated with conventional aluminum mill products can limit the formability, toughness, weldability, corrosion resistance and strength of structural members formed from these products. As an indication of formability, the typical elongation of AA 2195 aluminum alloys in the T8A3 condition along the longitudinal axis is approximately 11%. The typical elongation of AA 2219 aluminum alloys in the T87 condition along the longitudinal axis is approximately 10%. It is generally believed that the low formability of conventional aluminum mill products, especially in the AA 2195 aluminum alloys, is due to directionality of the grains and poor interlaminar strength. In addition, conventional aluminum mill products joined using common fusion welding techniques typically exhibit weld cracking in the heat affected zone, which can result in relatively weak weld joints. It is generally believed that the poor weldability of conventional aluminum mill products is a result of constitutional liquidation along the grain boundaries as the products are welded.

In addition too conventional aluminum wrought products, metal matrix composites have been implemented in the aerospace industry where high specific strength is required. Metal matrix composites are typically fabricated using powder metallurgy. Powder metallurgy products consist of fine metal powder and ceramic particles compressed together under controlled temperature and pressure (sintering) to produce a billet of material. The high expense associated with the production of fine metal powder and the sintering process makes these powder metallurgy billets less affordable.

In seeking to improve the material properties of structural members constructed of metals and metal alloys, it has been proposed to refine the grain size of the structural members through a process known as "equal angle extrusion." As illustrated in FIG. 1, equal angle extrusion involves forcing a workpiece 10, using pneumatic or hydraulic pressure, through a die 12 have a 90° bend. In theory, equal angle extrusion crushes the existing grain structure of the workpiece 10 such that the resulting material exiting the extrusion die 12 will exhibit a reduction in grain size. However, difficulties associated with large loads on the die 12 and cracking of the workpiece 10, can adversely affect the properties of the material existing the die. As a result, equal angle extrusion has not been used in large-scale production.

Thus, there remains a need for an apparatus for refining the grain structure of workpieces to thereby provide structural members having improved material properties, such as formability, weldability, toughness, corrosion resistance, and strength. The apparatus should be capable of operating on workpieces that are formed of a variety of metals and metal alloys and that have a variety of configurations. The apparatus also should be cost effective and should be scalable for use in large-scale production operations.

SUMMARY OF THE INVENTION

The present invention provides an apparatus and associated method for operating on a workpiece. According to one embodiment of the present invention, the apparatus comprises a die defining first and second apertures and an interior therebetween. The first aperture and the interior of the die are structured to receive the workpiece. The apparatus includes at least one rotatable pin extending at least partially into the interior of the die. In one embodiment, the die has first and second sides at least partially defining the interior and wherein the pin extends from the first side to the second side so as to traverse the interior of the die. The pin is structured to at least partially stir the workpiece as the workpiece moves through the interior of the die to thereby refine the grain structure of the workpiece. In one embodiment, the apparatus includes a ram structured to urge the workpiece through the interior of the die from the first aperture to the second aperture.

The interior of the die can be structured to shape the workpiece into a predetermined configuration, such as a square, a rectangle or a cylinder, to thereby cost effectively combine the operations of shaping the workpiece and refining the grain structure of the workpiece. In another embodiment, the interior of the die defines a chamber adjacent the second aperture that is structured to consolidate the workpiece. The rotatable pin can extend into the interior of the die between the first aperture and the chamber.

The apparatus can include a plurality of rotatable pins extending at least partially into the interior. Each of the pins is structured to stir the workpiece as the workpiece moves through the interior of the die. In another embodiment, the apparatus comprises a rotatable turret to which the plurality of pins are rotatably mounted. The turret is structured to individually rotate each of the pins in corresponding first directions and to collectively rotate the pins in a second direction. In one embodiment, the corresponding first directions are the same as the second direction. In another embodiment, the corresponding first directions are opposite to the second direction. In still another embodiment, the corresponding first directions comprise rotating at least two of the pins in opposite directions.

According to another embodiment of the present invention, the apparatus comprises at least one motor having a rotatable spindle. The apparatus includes a die defining first and second apertures and an interior extending therebetween, wherein the interior of the die is structured to form the workpiece. For example, in one embodiment, the interior of the die is structured to shape the workpiece into a predetermined configuration, such as a square, a rectangle or a cylinder. The apparatus includes at least one pin in rotatable communication with the spindle. The pin extends at least partially into the interior of the die and is structured to at least partially mix the workpiece as the workpiece moves through the interior to thereby refine the grain structure of the workpiece. In one embodiment, the die has first and second sides at least partially defining the interior and wherein the pin extends from the first side to the second side so as to traverse the interior of the die. The apparatus can include a ram structured to urge the workpiece through the interior of the die from the first aperture to the second aperture.

In another embodiment, the apparatus comprises a rotatable turret that is in rotatable communication with the spindle of the motor. The apparatus includes a plurality of pins each being in rotatable communication with the turret. Each of the pins extends from the turret at least partially into the interior of the die. The turret is structured to individually rotate each of the pins in corresponding first directions and to collectively rotate the pins in a second direction. The pins are structured to at least partially mix the workpiece as the workpiece moves through the interior of the die to thereby refine the grain structure of the workpiece. In one embodiment, the corresponding first directions are the same as the second direction. In another embodiment, the corresponding first directions are opposite to the second direction. In still another embodiment, the corresponding first directions comprise rotating at least two of the pins in opposite directions.

In another embodiment, the apparatus comprises a plurality of motors each having a rotatable spindle. The apparatus includes a plurality of pins each being in rotatable communication with a corresponding one of the spindles. Each of the pins extends at least partially into the interior of the die. The pins are structured to at least partially mix the workpiece as the workpiece moves through the interior of the die to thereby refine the grain structure of the workpiece.

The present invention also provides a method of operating on a workpiece. According to one embodiment, the method includes moving a workpiece through a die. Concurrently with the moving step, the workpiece is mixed with at least one rotating pin to thereby refine the grain structure of the workpiece. In one embodiment, the workpiece is heated concurrently with the mixing step. In another embodiment, the pin and/or die are heated concurrently with the mixing step. For example, the heating step can comprise heating the pin and/or die to a temperature between about 600° F. and about 1000° F. In another embodiment, the die is cooled concurrently with the mixing step. In yet another embodiment, the mixing step comprises individually rotating a plurality of pins in corresponding first directions and collectively rotating the plurality of pins in a second direction. In one embodiment, the corresponding first directions are the same as the second direction. In another embodiment, the corresponding first directions are opposite to the second direction. In still another embodiment, the corresponding first directions comprise rotating at least two of the pins in opposite directions.

The material properties of the workpiece can be further developed through selective heat treating. In one embodiment, the workpiece is solution heat treated prior to the moving step. In another embodiment, the workpiece is solution heat treated at a predetermined temperature schedule after the mixing step. In yet another embodiment, the workpiece is precipitation heat treated by aging at a second predetermined temperature schedule after the solution heat treating step.

The present invention also provides a preform for use in forming structural members and assemblies. According to one embodiment of the present invention, the preform comprises a body having predetermined dimensions and wherein the body comprises a refined grain structure having a cross-section comprising a curvilinear configuration. In one embodiment, the grain structure of the body comprises grains having equiaxed shape. In another embodiment, the grain structure comprises grains having a grain size of about 3 microns to about 5 microns. In another embodiment, the body is formed of aluminum, an aluminum alloy, titanium, a titanium alloy or a steel alloy. In still another embodiment, the body has an elongation of between about 15% and about 35%. In yet another embodiment, the body has an elongation of greater than about 20%.

Accordingly, there has been provided an apparatus and associated method for refining the grain structure of workpieces. The apparatus is capable of operating on workpieces that are formed of a variety of metals and metal alloys and that have a variety of configurations. In addition, the apparatus can be used in large-scale production to cost effectively combine operations, such as forming or shaping the workpieces, while at the same time refining the grain structure of the workpieces to thereby improve the material properties of the workpieces.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIG. 19 is a flow chart illustrating a method of operating on a workpiece, according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
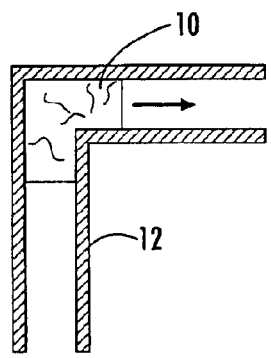
FIG. 1 is a cross-sectional view illustrating a die used for equal angle extrusion, as is known in the art.
Figure 2:
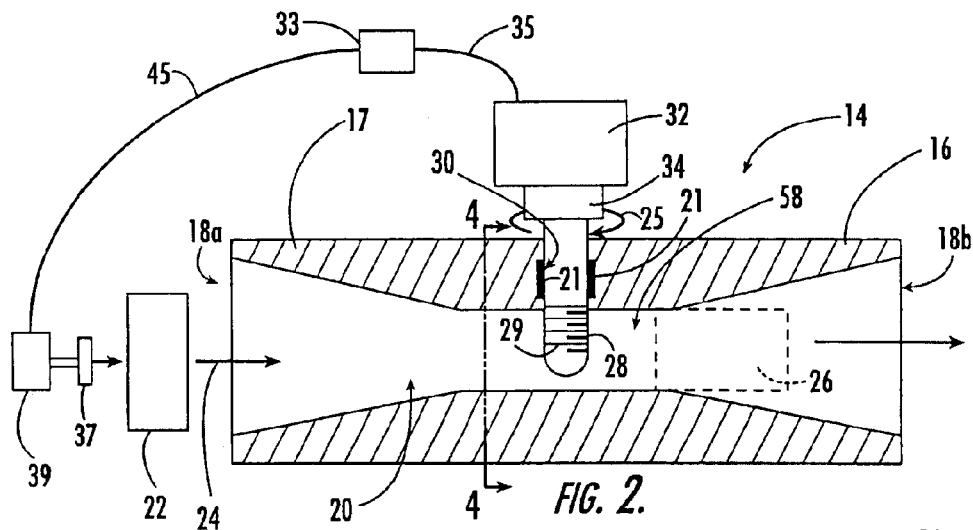
FIG. 2 is a cross-sectional view illustrating an apparatus for operating on a workpiece, according to one embodiment of the present invention.
Figure 3A:
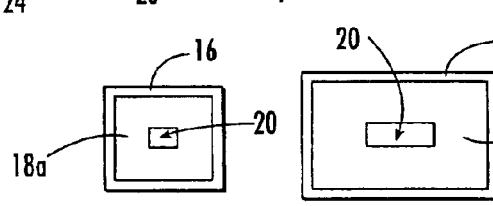
FIGS. 3A–3D are plan views illustrating exemplary configurations for the first aperture and interior of the die, according to various embodiments of the present invention.
Figure 3B:
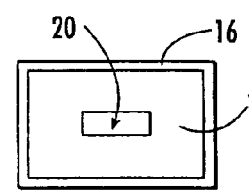
Figure 3C:
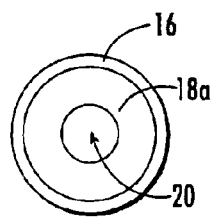
Figure 3D:
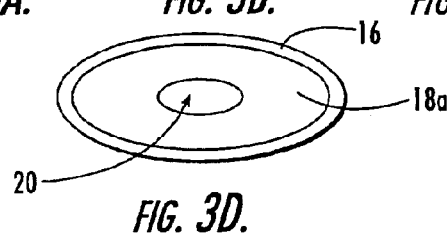

Referring now to the drawings, and in particular to FIG. 2, there is illustrated an apparatus 14 for operating on a workpiece 22 to thereby form a preform 26, according to one embodiment of the present invention. The apparatus 14 includes a die 16 defining first and second apertures 18a, b and an interior 20 therebetween. The first aperture 18a and the interior 20 of the die 16 are structured to receive the workpiece 22, as indicated by the arrow 24. More specifically, the first aperture 18a and at least a portion of the interior 20 of the die 16 have a configuration generally corresponding to the configuration of the workpiece 22. For purposes of example only and not limitation, the first aperture 18a and the initial portion of the interior 20 of the die 16 can have a square, rectangular, circular, or elliptical configuration, as illustrated in FIGS. 3A–3D, which generally corresponds to the configuration of the workpiece 22.

As illustrated in FIG. 2, the interior 20 of the die 16 also can be structured to shape or form the workpiece 22 by reducing the cross-sectional area of the workpiece to form a preform 26 having a predetermined configuration, such as a square, a rectangle, a tube, or a cylinder, with pre-selected dimensions. The shaping and forming operations performed by the interior 20 of the die 16 are similar to the bulk deformation processes associated with extrusion, drawing, or swaging. While structuring the interior 20 of the die 16 to perform the shaping and forming operations is advantageous since it can eliminate the necessity of additional steps in the manufacturing process of the preform 26, the shaping and forming operations are not required for purposes of the present invention.

The structure and dimensions of the die 16 will depend on the configuration and dimensions of the workpieces 22 and the desired configuration and dimensions of the resulting preforms 26. The die 16 can be constructed of a variety of materials, including steel alloys, cast iron and nonferrous alloys. The die 16 can be cast, forged or machined from stock material by processes such as milling, turning, grinding, electrical and electrochemical machining, and polishing, as is known in the art. To obtain improved hardness, wear resistance, and strength, the die 16 can be heat treated. Thereafter, the die 16 can be subjected to grinding, polishing, or chemical and electrical machining processes to obtain the desired surface finish and dimensional accuracy. To extend die life, coatings can be applied to the die 16, as is known in the art.

The workpiece 22 can be stock material selected based on the desired material properties, configuration and dimensions of the resulting preform 26. More specifically, the workpiece 22 can be formed from a variety of materials, as required by the specific design loads, environmental conditions, and specifications of the resulting structural assembly to be formed from the preform 26. For preforms 26 that will be used in aerospace applications, where weight and strength are of critical concern, the workpiece 22 is preferably formed of aluminum, an aluminum alloy, titanium, a titanium alloy or a steel alloy. If necessary, the workpiece 22 can be pre-machined using known machining methods so that the workpiece has the desired dimensions and configuration. In addition, the workpiece 22 can be heat treated, such as by precipitation hardening, or more preferably, by solution heat treating, as discussed more fully below.

Figure 4:
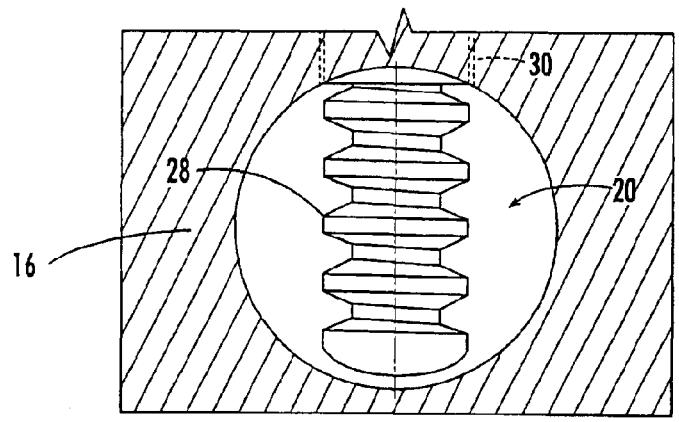
FIG. 4 is a cross-sectional view illustrating the pin of the apparatus of FIG. 2 along lines 4—4 of FIG. 2.

According to one embodiment of the present invention, as illustrated in FIGS. 2 and 4, the apparatus 14 includes a rotatable pin 28 extending 16 partially into the interior 20 of the die. The pin 28 extends into the die 16 through an aperture 30 in the side 17 of the die 16. One or more bearings 21 are preferably mounted or seated within the aperture 30 to rotatably support the pin 28. For example, the bearings 21 can include thrust and side load bearings, as is known in the art.

Figure 5:
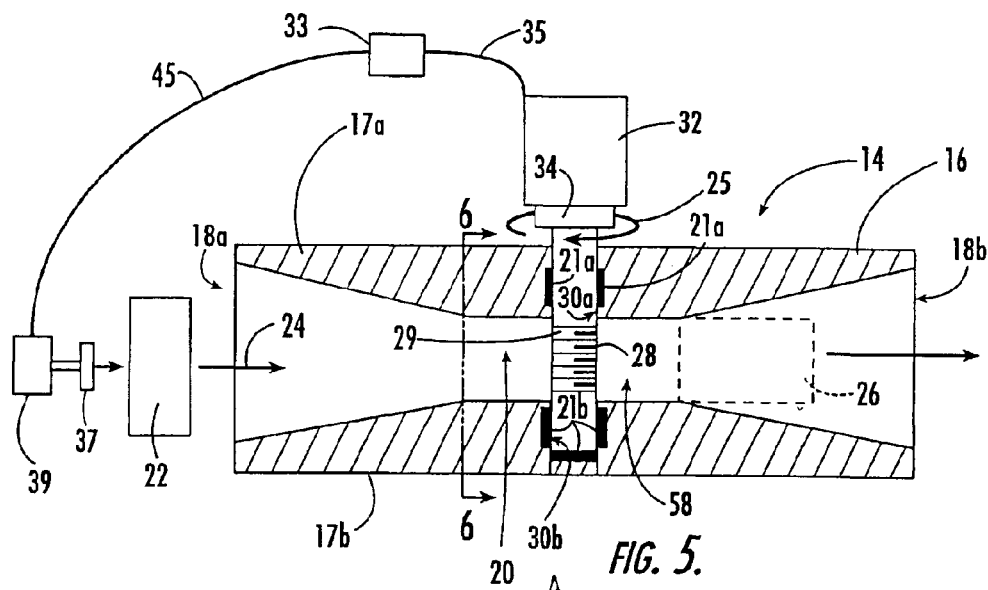
FIG. 5 is a cross-sectional view illustrating an apparatus for operating on a workpiece, according to another embodiment of the present invention.
Figure 6:
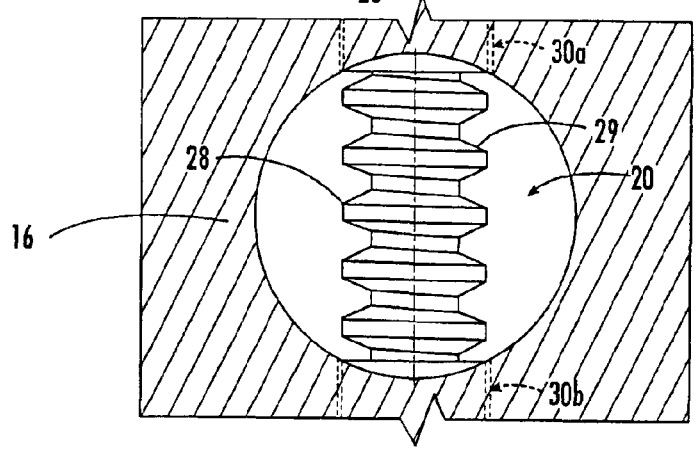
FIG. 6 is a cross-sectional view illustrating the pin of the apparatus of FIG. 5 along lines 6—6 of FIG. 5.
Figure 12A:
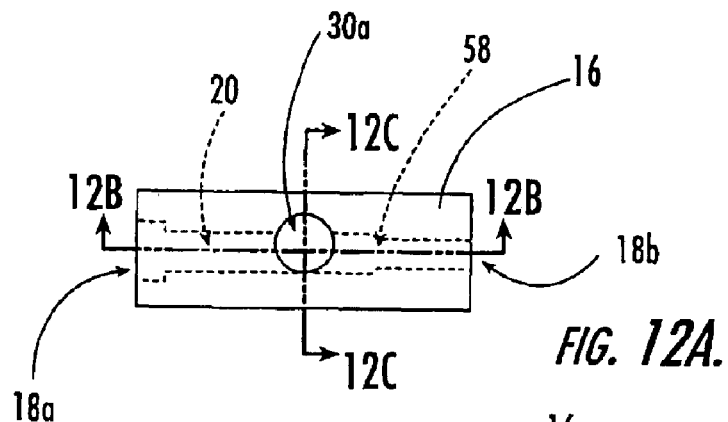
FIG. 12A is a plan view illustrating an apparatus for operating on a workpiece, according to another embodiment of the present invention.
Figure 12B:
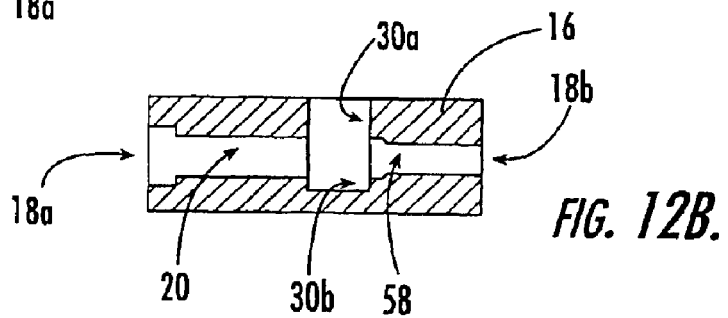
FIG. 12B is a sectional view illustrating the apparatus of FIG. 12A along lines 12B—12B.
Figure 12C:
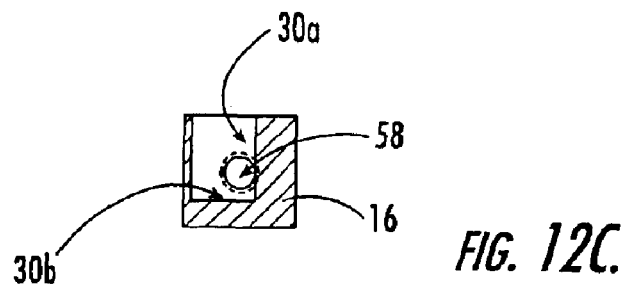
FIG. 12C is a sectional view illustrating the apparatus of FIG. 12A along lines 12C—12C.
Figure 13B:
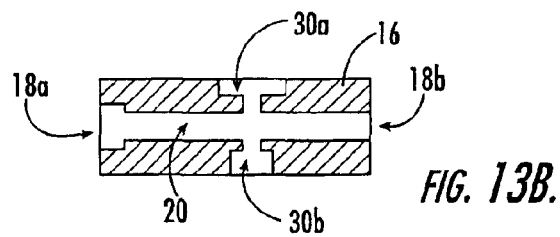
FIG. 13B is a sectional view illustrating the apparatus of FIG. 13A along lines 13B—13B.
Figure 13A:
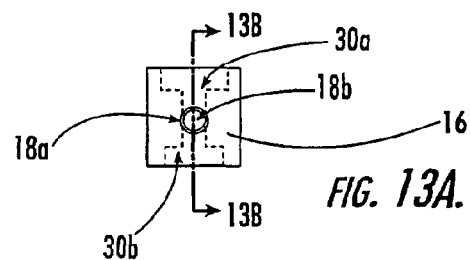
FIG. 13A is an elevation view illustrating the first end of an apparatus for operating on a workpiece, according to another embodiment of the present invention.

In another embodiment, as illustrated in FIGS. 5 and 6, the die 16 has first and second sides 17a, b at least partially defining the interior 20 of the die. The pin 28 extends from the first side 17a to the second side 17b of the die 16 so as to traverse the interior 20 of the die. The first side 17a of the die 16 defines a corresponding aperture 30a through which the pin 28 extends, and the second side 17b of the die 16 defines a corresponding aperture 30b that is structured to receive the end of the pin 28. Bearings 21a, b preferably are mounted or seated within the apertures 30a, b of the first and second sides 17a, b of the die 16 to rotatably support the pin 28 within each corresponding aperture 30a, b. As illustrated in FIGS. 12A–12C, the apertures 30a, b can be offset in relation to the interior 20 of the die 16 or, as illustrated in FIGS. 13A–13B, the apertures 30a, b can be centered in relation to the interior 20 of the die 16. Similarly, the aperture 30 for pins 28 that extend only partially into the interior 20 of the die 16, as is illustrated in FIGS. 2 and 4, also can be offset or centered in relation to the interior of the die.

In another embodiment (not shown), the die 16 is an "open" die. In this regard, the interior 20 of the die 16 is defined by two lateral sides and a bottom side, which can include a worktable or similar support surface. The rotatable pin 28 extends at least partially into the interior 20 of the die 16 through the open topside of the die. The lateral sides of the die preferably include bracing to support the sides during operation.

Figure 12D:
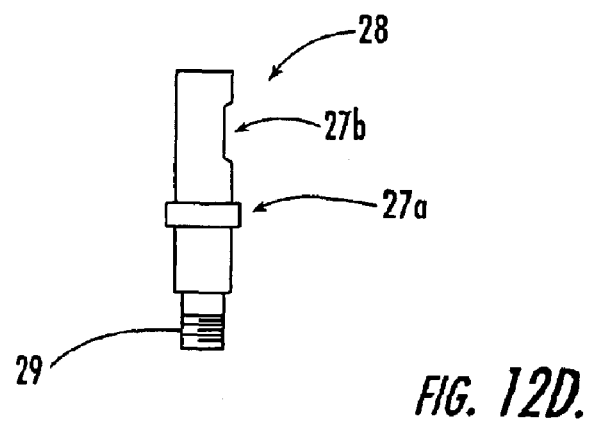
FIG. 12D is an elevation view illustrating the pin of the apparatus of FIG. 12A.
Figure 13C:
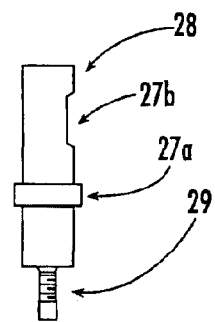
FIG. 13C is an elevation view illustrating the pin of the apparatus of FIG. 13A.

As illustrated in FIGS. 2 and 5, the apparatus 14 includes at least one motor 32 having a rotatable spindle 34 that is in rotatable communication with the pin 28 such that the pin extends from the spindle at least partially into the interior 20 of the die 16. The spindle 34 preferably includes a chuck or collet (not shown), as is known in the art, structured to releasable receive and secure one end of the pin 28. For example, as illustrated in FIGS. 12D and 13C, the pin 28 can have a generally circular cross-sectional configuration that is received by a collet (not shown) and can include a stop 27a for the collet, as well as a flat 27b structured to receive the set screw, as is known in the art.

The motor 32 includes a device, such as a CNC machine, milling machine or drill (not shown), that is structured to rotate the spindle 34 and pin 28, as indicated by the arrows 25 in FIGS. 2 and 5. The specifications of the motor 32 will depend on the dimensions and material properties of the workpiece 22. For example, according to one embodiment, a 35 horsepower motor 32 can be used to mix ¼ inch aluminum workpieces 22. The motor 32 can be supported on the die 16 by a support structure and fasteners (not shown), but preferably is removable from the die so that the die can be replaced for purposes of repair or to substitute a different die to accommodate variations in the configuration or dimensions of the workpieces 22 and/or resulting preforms 26. When operating the apparatus 14, additional support preferably is provided underneath and around the die 16, such as a worktable and bracing (not shown), to support the die and to prevent movement of the die relative to the motor 32. The motor 32 can be manually operated, but preferably is in electrical communication through suitable electrical or optical wiring 35 with a computer or microprocessor 33 operating under software control.

The motors 32 illustrated in FIGS. 2 and 5 are positioned on the topside of the die 16, and the pins 28 extend vertically into the interior 20 of the die from the topside toward the bottom side of the die. However, the placement of the motor 32 is not limited to the topside of the die 16, as the motor can be positioned on a lateral side or the bottom side of the die, such that the corresponding pin 28 extends into the interior 20 of the die horizontally from one lateral side toward the opposite lateral side or vertically from the bottom side toward the topside, respectively. The pin 28 also can extend into the interior 20 of the die 16 angularly from one side toward an adjacent side or toward the opposite side.

Figure 7:
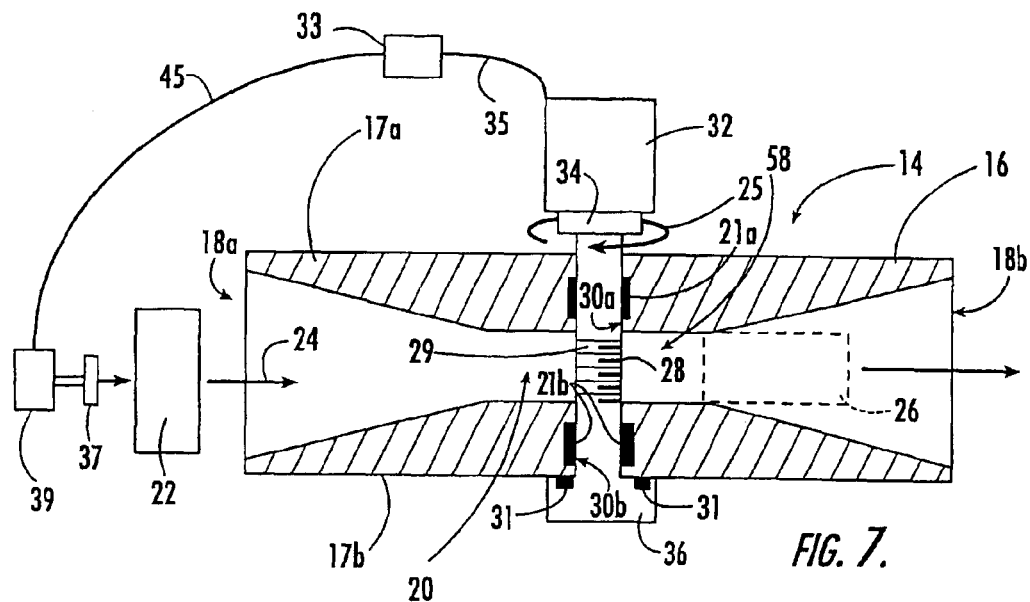
FIG. 7 is a cross-sectional view illustrating an apparatus for operating on a workpiece, according to another embodiment of the present invention.

Referring to FIG. 7, in one embodiment of the present invention the motor 32 comprises a milling machine to which the die 16 is attached via the pin 28. In this regard, the end of the pin 28 opposite the motor 32 has a diameter larger than the diameter of the aperture 30b defined by the second side 17b of the die 16 thereby forming a backing 36 to support the die. One or more bearings 31 are preferably positioned between the outer surface of the second side 17b of the die 16 and the backing 36 to thereby facilitate rotation of the backing relative to the die. For example, as illustrated in FIG. 7, the bearings 31 are mounted to, or seated within, the backing 36 of the pin 28. As described above, additional support is preferably provided underneath and around the die 16, such as a worktable and bracing (not shown), to support the die and to prevent movement of the die relative to the milling machine.

Figure 8:
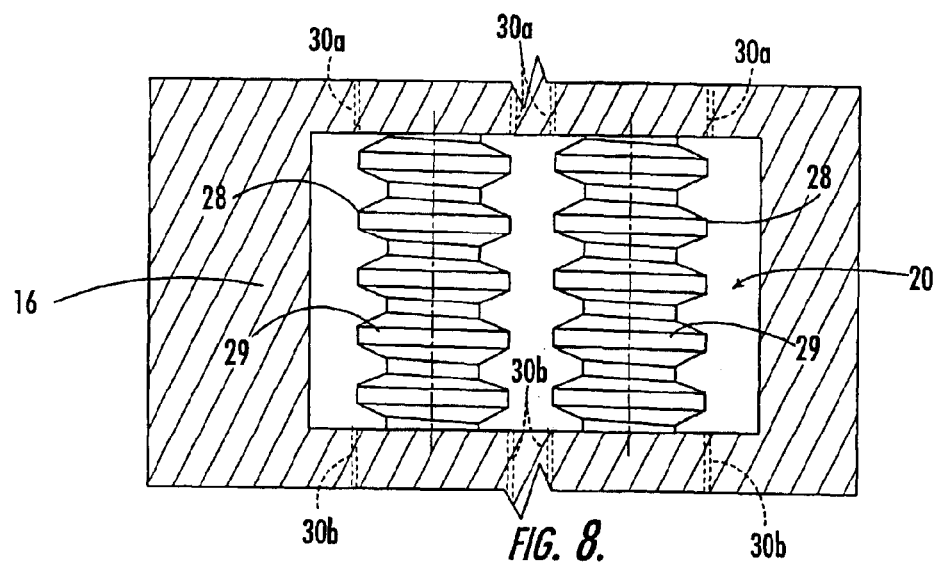
FIG. 8 is a cross-sectional view illustrating the pins of an apparatus for operating on a workpiece, according to one embodiment of the present invention.

In other embodiments, the apparatus 14 includes a plurality of rotatable pins 28. The plurality of pins 28 can extend partially into the interior 20 of the die 16, as illustrated in FIG. 2, and/or can extend from the first side 17a to the second side 17b of the die so as to traverse the interior of the die, as illustrated in FIG. 5. Regarding the orientation of the pins 28 relative to the interior 20 of the die 16, the pins 28 can extend from the topside of the die toward the bottom side of the die, from the bottom side of the die toward the topside of the die, from one lateral side toward the opposite lateral side, and/or angularly between two adjacent sides or two opposite sides. Referring to FIG. 8, two pins 28 are shown traversing the interior 20 of the die 16 in a side-by-side configuration. In other embodiments (not shown), the pins 28 are positioned or spaced along the length of the interior 20 of the die 16 in either a straight-line or staggered configuration. The pins 28 also can be spaced along the length of the interior 20 of the die 16 in a side-by-side configuration. As discussed above, for pins 28 extending partially into the interior 20 of the die 16, the pins can be rotatably supported within the corresponding aperture 30 defined by the respective side 17 of the die with bearings 21. For pins 28 that traverse the interior 20 of the die 16, the pins can be rotatably supported within the corresponding apertures 30a, b defined by the respective sides 17a, b of the die with bearings 21a, b, and in the case of pins defining a backing 36, with bearings 31.

For the embodiments of the apparatus 14 that include two or more pins 28, the apparatus can include a plurality of motors 32, each having a rotatable spindle 34 that is in rotatable communication with a corresponding pin 28. Each motor 32 can be manually operated, but preferably all of the motors are in electrical communication through suitable electrical or optical wiring 35 with a computer or microprocessor 33 operating under software control. The motors 32 can be structured to rotate the pins 28 in the same direction, in opposite directions, or a combination of both.

In other embodiments of the present, the apparatus 14 includes a motor 32 and a drive assembly 38 that is structured to rotatably communicate with one or more of the pins 28. For example, in one embodiment (not shown), the drive assembly 38 includes a shaft rotatably mounted within an aperture extending through one side of the die. One end of the shaft is structured to be rotatably received by the spindle of a motor, while the other end of the shaft includes a chuck or collet for receiving and securing an end of a corresponding pin. The chuck or collet preferably is recessed flush within the corresponding side of the die so as not to obstruct movement of the workpiece through the interior of the die. The aperture preferably includes one or more bearings mounted therein to rotatably support the shaft. The aperture preferably is sealed, for example, using a metal cover with an elastomeric o-ring or the like, as is known in the art, to prevent material or other contaminants from entering the aperture and damaging the shaft or a bearing.

Figure 9:
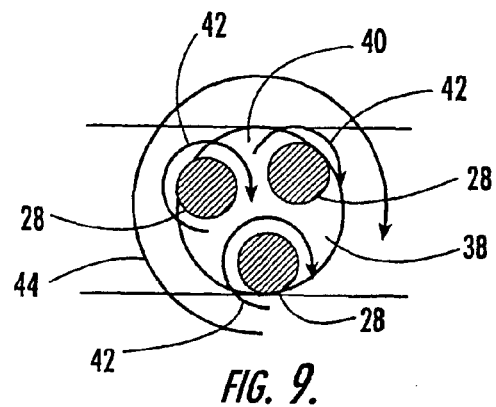
FIG. 9 is a schematic illustrating the directions of individual and collective rotation of the pins of an apparatus for operating on a workpiece, according to one embodiment of the present invention.
Figure 10:
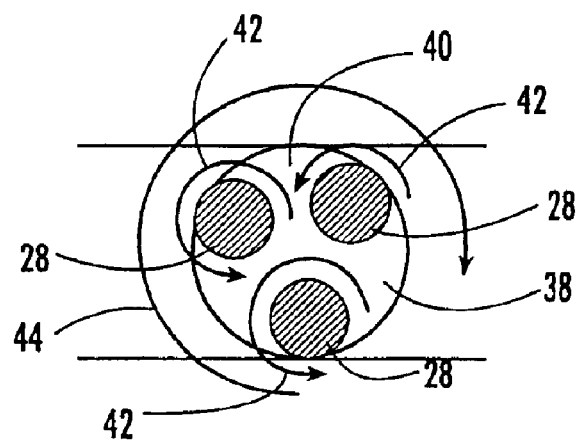
FIG. 10 is a schematic illustrating the directions of individual and collective rotation of the pins of an apparatus for operating on a workpiece, according to another embodiment of the present invention.
Figure 11:
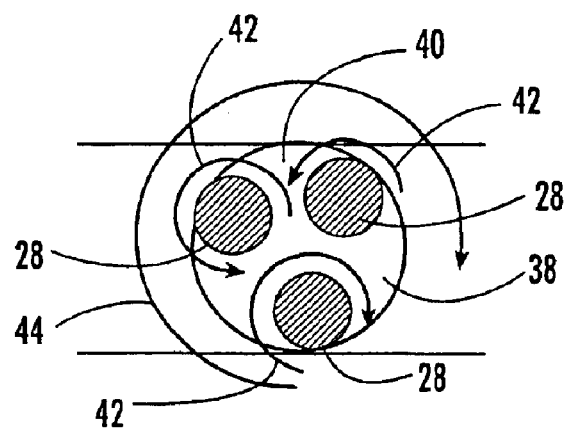
FIG. 11 is a schematic illustrating the directions of individual and collective rotation of the pins of an apparatus for operating on a workpiece, according to another embodiment of the present invention.
Figure 16:
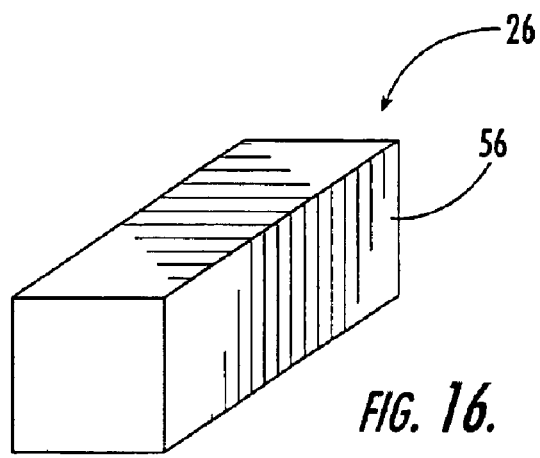
FIG. 16 is a perspective view of a preform, according to one embodiment of the present invention.
Figure 15:
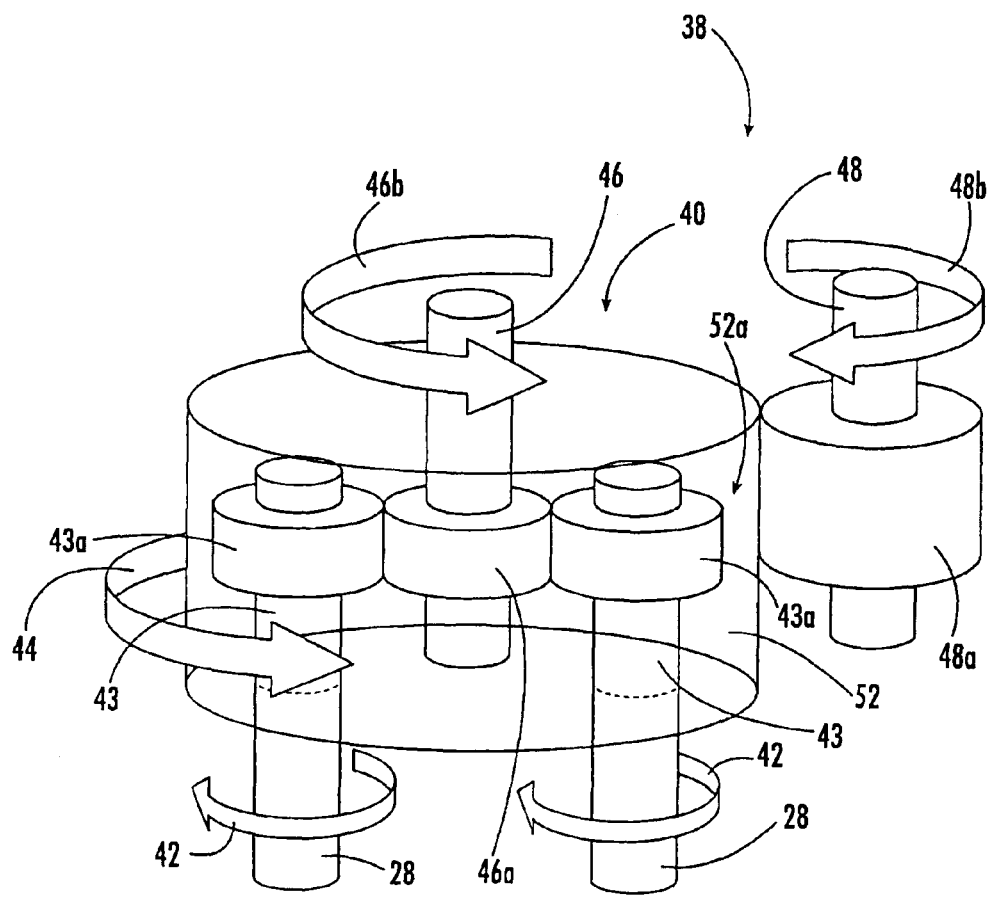
FIG. 15 is a perspective view illustrating a rotatable turret, according to one embodiment of the present invention.
Figure 17:
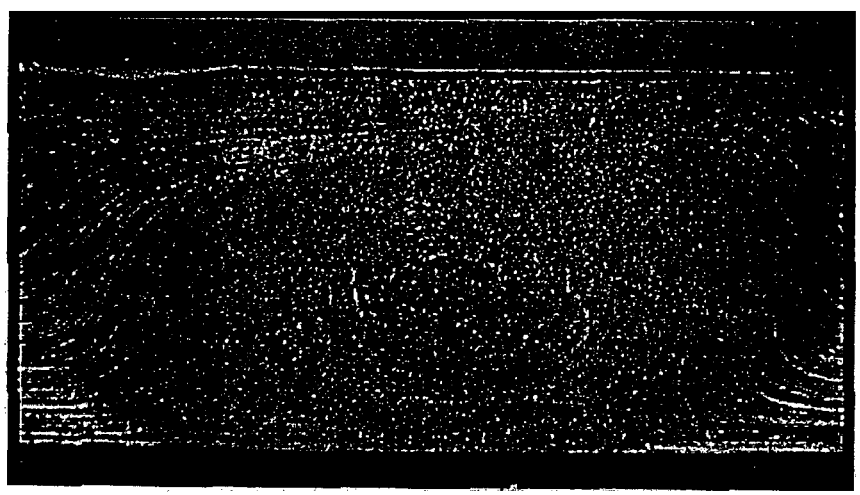
FIG. 17 is a black and white photograph illustrating a cross-section of a preform, according to one embodiment of the present invention.

According to another embodiment, the drive assembly 38 of the apparatus 14 includes a rotatable turret 40, such as the one illustrated in FIG. 15, to which two or more pins 28 are rotatably mounted. Each of the pins 28 extends from the turret 40 at least partially into the interior 20 of the die 16. The turret 40 is in rotatable communication with at least one spindle 34 of at least one motor 32 and is structured to individually rotate each of the pins 28 in corresponding first directions 42 and to collectively rotate the pins in a second direction 44. More specifically, the turret 40 transmits the torque generated by the motor 32 from the spindle 34 to the pins 28 both individually and collectively. The corresponding first directions 42 of rotation of the individual pins 28 can be the same as the second direction 44, as illustrated in FIG. 9, or can be opposite to the second direction 44, as illustrated in FIG. 10. In addition, as illustrated in FIG. 11, the corresponding first directions 42 can include rotating at least two of the pins 28 in opposite directions.

According to one embodiment, as illustrated in FIG. 15, the turret 40 includes a body 52 and a first shaft 46. The first shaft 46 extends from the body 52 through an aperture 30 defined by a side of the die 16 to a spindle 34 of a motor 32, as described above for the pin 28. The spindle 34 preferably includes a chuck or collet (not shown), as is known in the art, for releasably receiving and securing the end of the first shaft 46. Bearings (not shown) are preferably mounted or seated within the aperture 30 to rotatably support the first shaft 46 of the turret 40 within the aperture 30. The body 52 of the turret 40 preferably includes a plurality of chucks or collets 43 rotatably mounted to the body using bearings (not shown). Each chuck or collet 43 is structured to releasably receive and secure an end of a corresponding pin 28. Each pin 28 extends from the body 52 of the turret 40 partially into the interior 20 of the die 16. So as not to obstruct the flow of the workpiece through the interior 20 of the die 16, the side of the die preferably defines a recess (not shown) configured to receive the body 52 of the turret 40 so that the body of the turret does not extend into the interior of the die.

The first shaft 46 is structured to individually rotate each of the pins 28 in corresponding first directions 42. According to one embodiment, as illustrated in FIG. 15, the first shaft 46 includes a gear 46a that rotatably communicates with corresponding gears 43a attached to each of the chucks or collets 43. As the first shaft 46 rotates, as indicated by arrow 46b, the first shaft transmits the torque generated by the motor 32 from the spindle 34 to the chuck or collets 43, through the corresponding gears 46a, 43a. The chucks or collets 43 then rotate thereby rotating the pins 28 individually in the first direction 42.

According to the embodiment illustrated in FIG. 15, the turret 40 includes a second shaft 48 that extends through an aperture 30 defined by the side of the die 16 to a spindle 34 of a motor 32, as described above for the pin 28. The spindle 34 preferably includes a chuck or collet (not shown), as is known in the art, for releasably receiving and securing the end of the second shaft 48. Bearings (not shown) are preferably mounted or seated within the aperture 30 to rotatably support the second shaft 48 of the turret 40 within the aperture 30. The second shaft 48 is structured to collec- tively rotate the pins 28 in a second direction 44. According to one embodiment, as illustrated in FIG. 15, the second shaft 48 includes a gear 48a that rotatably communicates with a corresponding gear 52a defined by the exterior of the body 52 of the turret 40. As the second shaft 48 rotates, as indicated by arrow 48b, the second shaft transmits the torque generated by the motor 32 from the spindle 34 to the body 52 of the turret 40, through the corresponding gears 48a, 52a. The body 52 of the turret 40 then rotates thereby rotating the pins 28 collectively in the second direction 44. By varying the rate of rotation of the first and second shafts 46, 48, the rate of rotation of the pins 28 individually and collectively can be modified.

In an alternate embodiment (not shown), the first and second shafts 46, 48 of the turret 40 are connected together using suitable gearing to a third shaft that connects to a spindle of a motor. According to this embodiment, the rate of rotation of pins 28 individually and collectively can be modified by changing the ratio of the gearing between the first and second shafts and the third shaft.

According to another embodiment (not shown), the turret 40 includes first and second parts. The first part of the turret is similar to the embodiments described above. The second part of the turret includes a body and a shaft extending therefrom that is rotatably mounted to the side of the die opposite the first part of the turret. The body of the second part of the turret includes a plurality of chucks or collets for releasably receiving and securing the other end of each corresponding pin so that the pins traverse the interior of the die. The second part of the turret is passive in that the second part does not transmit torque to the pins. Rather, each chuck or collet of the second part of the turret is structured to individually rotate with the corresponding pin as the pins are individually rotated by the chucks or collets of the first part of the turret and the second part is structured to rotate with the pins as the pins are collectively rotated by the first part. So as not to obstruct the movement of the workpiece through the interior of the die, preferably the first and second sides of the die each define a recess configured to receive the corresponding first and second parts of the turret so that the first and second parts do not extend into the interior of the die.

As illustrated in FIGS. 2, 5, 7, and 14, the apparatus 14 preferably includes a ram 37 structured to urge the workpiece 22 through the interior 20 of the die 16 from the first aperture 18a to the second aperture 18b. The ram 37 can be powered using a hydraulic, pneumatic, or electrical power source 39, as is known in the art. The ram 37 can be operated manually, but preferably is in electrical communication through suitable electrical or optical wiring 45 with a computer or microprocessor 33 operating under software control. The ram 37 preferably stops short of contacting the pins 28, then another workpiece 22 can be added and the process resumes.

Each pin 28 is structured to at least partially stir the workpiece 22 as the workpiece moves through the interior 20 of the die 16 to thereby refine the grain structure of the workpiece. More specifically, as illustrated in FIGS. 4, 6, 8, 12D, and 13C, each pin 28 preferably includes threads 29 that will mix or stir the workpiece 22 as the workpiece is urged by the ram 37 through the interior 20 of the die 16 from the first aperture 18a to the second aperture 18b. This process is similar to friction stir welding wherein a rotating threaded pin is inserted between the opposing faces of a pair of workpieces while urging the workpieces together. See U.S. Pat. No. 5,460,317 to Thomas et al. for a general discussion of friction stir welding, the entire contents of which are incorporated herein by reference.

The rotation of the threaded pin or pins 28 against and through the workpiece 22 creates friction that generates sufficient heat energy to plasticize the workpiece material proximate to the rotating pin or pins. Advantageously, as the material of the workpiece 22 passes the rotating pin or pins 28 of the apparatus 14 and thereafter cools, a preform 26, such as the one illustrated in FIG. 14, will be formed having a refined grain structure with grains having an equiaxed shape and grain sizes ranging in order of magnitude from approximately 0.0001 to approximately 0.0002 inches (approximately 3 microns to approximately 5 microns). The refined grain structure of the preform 26 resists the formation and propagation of micro-cracks and exhibits improved strength, ductility and toughness, as well as improved intergranular corrosion and fatigue resistance.

According to one embodiment, the workpiece 22 comprises metal chips (e.g., chips and shavings produced during machining process) or a combination of metal chips, shavings and fine ceramic particles (e.g., silicon carbide whiskers). As the workpiece 22 is driven into the at least one pin 28, the pin 28 breaks up and mixes the workpiece components (chips and ceramic powder) and consolidates the components into a perform 26. This embodiment can serve as a recycling tool by forming a structural member or perform from manufacturing scrap (chips and shavings) or produce a metal matrix composite without using metal powder or sintering.

As illustrated in FIGS. 2, 5, and 7, the interior 20 of the die 16 preferably defines a chamber 58 adjacent the second aperture 18b that is structured to exert pressure on the workpiece 22 to re-consolidate the workpiece after the workpiece has been mixed by the pin or pins 28. For example, the chamber 58 can be formed by a further reduction in the cross-sectional area of the interior 20 of the die 16. The pressure exerted on the workpiece 22 by the chamber 58 forces any air or other gases from the material that may have been mixed into the material by the rotating pin or pins 28 to thereby prevent porosity within the preform 26.

Figure 14:
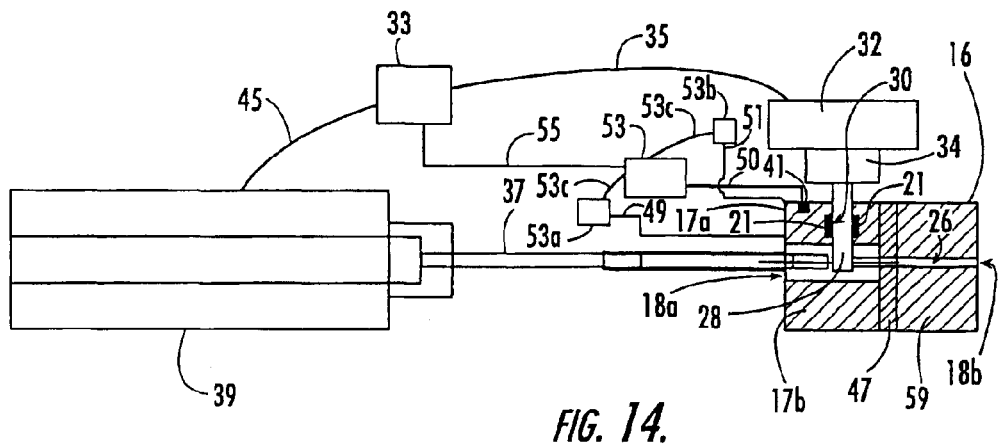
FIG. 14 is an elevation view illustrating an apparatus for operating on a workpiece, according to another embodiment of the present invention.

As illustrated in FIG. 14, the preform 26 comprises a body 56 having predetermined dimensions, which as discussed above, will depend on the configuration and dimensions of the interior 20 of the die 16. The body 56 comprises a refined grain structure having a cross-section comprising a curvilinear configuration created by the stirring or mixing action of the rotating pin or pins 28. A photograph of the curvilinear cross-section of a preform 26 having a refined grain structure formed according to the present invention is illustrated at FIG. 15. As discussed above, the preform 26 can be constructed of a variety of material, as required by the specific design loads, environmental conditions, and specifications of the resulting structural assembly to be formed from the preform. For preforms 26 that will be used in aerospace applications, where weight and strength are of critical concern, the preform preferably is formed of aluminum, an aluminum alloy, titanium, a titanium alloy or a steel alloy.

Advantageously, because of the refined grain structure, a preform 26 formed according to the present invention will have an elongation of between about 15% and about 35% and, more preferably, an elongation of greater than about 20%. For example, AA 2195 aluminum alloys and AA 2219 aluminum alloys with a refined grain structure according to the present invention can have an elongation along the longitudinal axis of approximately 21.5% and approximately 29%, respectively.

A further increase in elongation can be obtained by an additional heat treatment, such as an annealing process or precipitation hardening. Annealing refers to a heat treatment in which material is exposed to an elevated temperature for an extended time period and then slowly cooled. The annealing process consists of three stages. First, the preform 26 is heated to a desired temperature, which will depend on the particular composition of the material. For example, a perform 26 formed of an aluminum alloy can be annealed around 700° F. Second, the material is held so that the preform 26 can soak at that temperature for a predetermined period of time. Third, the preform 26 is cooled to room temperature. For example, a perform 26 formed of an aluminum alloy can be soaked for approximately 8 hours. It has been found that a full annealing process increased the percent elongation of the AA 2195 aluminum alloys and AA 2219 aluminum alloys having a refined grain structure formed according to the present invention from approximately 21.5% to approximately 26% and from approximately 29% to approximately 34%, respectively.

Figure 18A:
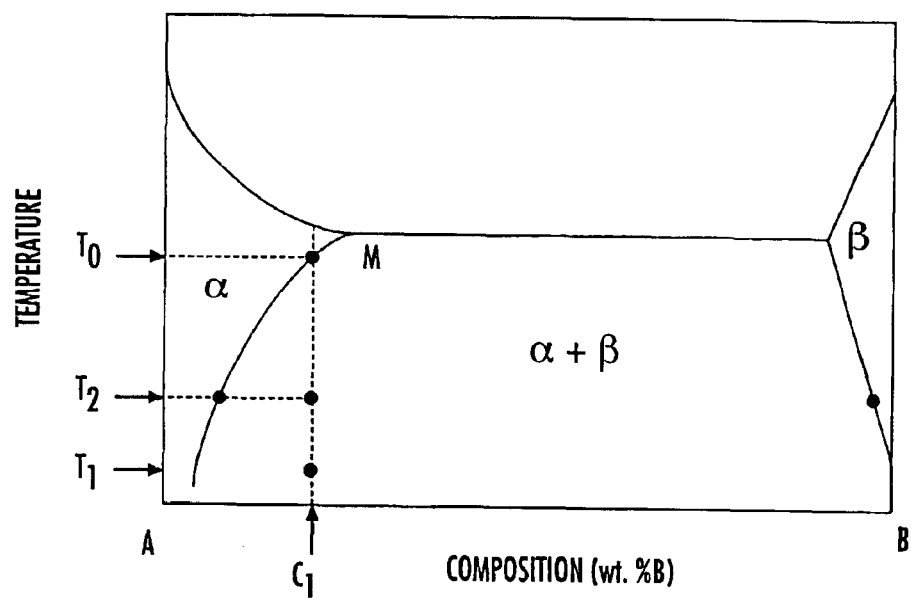
FIG. 18A is a hypothetical phase diagram for a precipitation-hardenable binary metal alloy system.

Precipitation hardening of metal alloys is a process whereby the mechanical properties of the metal alloy are improved by the formation of uniformly dispersed particles or precipitates of one or more secondary phases within the original phase matrix. Precipitation hardening requires that the metal alloy undergo two heat treatment processes, the first process being a solution heat treatment and the second process being a precipitation heat treatment. Referring to FIG. 18A, there is shown a hypothetical phase diagram for a precipitation-hardenable metal alloy composed of alloying elements A and B. Although FIG. 18A illustrates a phase diagram for a binary system, precipitation-hardenable metal alloys may contain two or more alloying elements. For a metal alloy to be precipitation hardenable, the alloy must have an appreciable maximum solubility of one element in the other, on the order of several percent, and a solubility limit that rapidly decreases in concentration of the major element with temperature reduction. Both of these requirements are satisfied by the hypothetical phase diagram of FIG. 18A, where the maximum solubility is designated by M. Additionally, the composition of a precipitation-hardenable metal alloy must be less than the maximum solubility M. Examples of some of the binary and ternary metal alloys that are precipitation hardenable include aluminum-calcium, aluminum-chromium, aluminum-cobalt, aluminum-copper, aluminum-iron-titanium, aluminum-gallium-germanium, aluminum-gallium-indium, aluminum-germanium-tin, aluminum-lithium, aluminum-lithium-magnesium, aluminum-manganese, aluminum-molybdenum, aluminum-nickel-titanium, aluminum-niobium, aluminum-silicon, copper-beryllium, copper-tin, magnesium-aluminum, as well as some ferrous alloys.

Figure 18B:
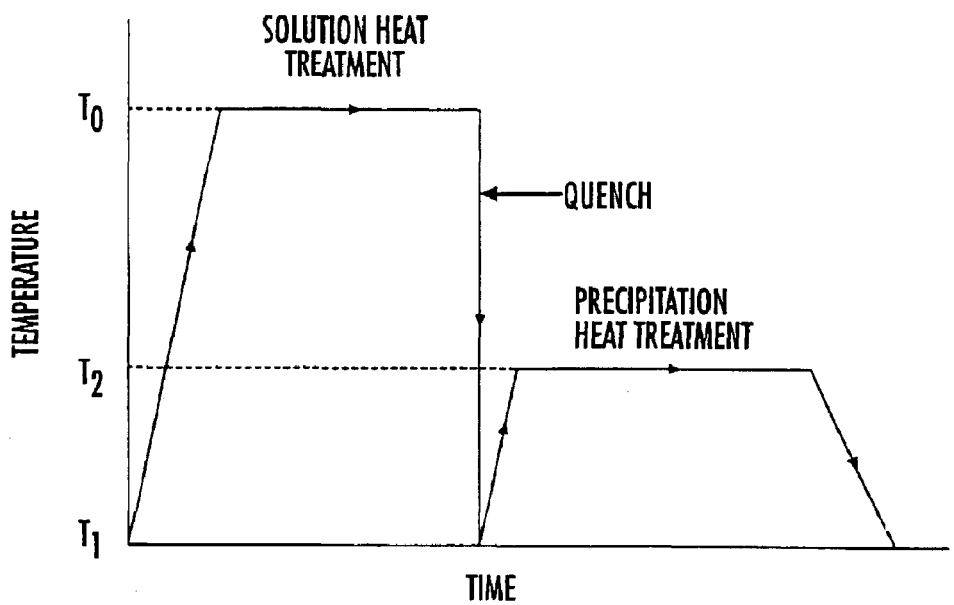
FIG. 18B is a schematic temperature-versus-time plot showing both solution and precipitation heat treatments for precipitation hardening of the hypothetical binary metal alloy system of FIG. 18A.

In the hypothetical binary system illustrated in FIG. 18A, element A designates the original phase matrix, while element B designates the solute or secondary element. To form the uniformly dispersed particles or precipitates of the secondary alloying element within the original phase matrix of the preform 26, the phase associated with the secondary alloying element must first be completely dissolved, such that the only remaining phase is the phase associated with the original phase matrix. The phase associated with the secondary alloying element is dissolved through a solution heat treatment process at a first predetermined temperature schedule. To illustrate the solution heat treatment process, reference is made to FIG. 18A and the metal alloy composed of a predetermined percentage of elements A and B designated by $C_1$. At ambient temperature, the hypothetical metal alloy of the preform 26 will be in an equilibrium state and will contain both the $\alpha$ phase of element A and the $\beta$ phase of element B. During the solution heat treatment process, the temperature of the preform 26 is raised to temperature $T_0$. At temperature $T_0$, the β phase or solute atoms of element B begin to dissolve. As shown in FIG. 18B, the preform 26 is maintained at temperature $T_0$ for a sufficient period of time, designated $t_1$, to allow all of the β phase to dissolve so that the alloy contains only the α phase of composition $C_1$.

Once the β phase has completely dissolved, the preform 26 is rapidly cooled or quenched to ambient temperature, which is designated by $T_1$, as shown in FIGS. 18A and 18B. The rapid cooling inhibits the formation of the β phase so that only the α phase solid solution supersaturated with B atoms is present. However, the preform 26 in the α phase at this temperature is in a nonequilibrium state with an incomplete temper, such that generally the β phase will gradually begin to form in the existing α phase matrix. In this nonequilibrium state, most metal alloys are relatively soft and weak.

Following solution heat treating, precipitation hardening is completed by precipitation heat treating the preform 26 through natural or artificial aging of the preform to the desired temper at a predetermined temperature schedule. Referring again to FIGS. 18A and 18B, precipitation heat treating or aging requires that the preform 26 undergo an isothermal heat treatment whereby the temperature of the assembly is raised to a predetermined temperature, designated by $T_2$, for a predetermined amount of time, designated $t_2$. The temperature $T_2$ is within the α and β two-phase region of the hypothetical phase diagram and is a temperature at which the diffusion rates for the B atoms become appreciable. The diffusion of the B atoms into a β phase results in the formation of finely dispersed particles of the B alloy element. Once the desired amount of diffusion has taken place, the preform 26 may be cooled to room temperature.

The character of the β phase particles, and thus the strength and hardness for a given metal alloy used to form the preform 26 is dependent upon the precipitation temperature, designated $T_2$, and the aging time at this temperature, designated $t_2$. Notably, some metal alloys will age at room temperature over an extended period of time, commonly denoted natural aging, while other metal alloys require artificially raised temperatures, commonly denoted artificial aging.

Figure 18C:
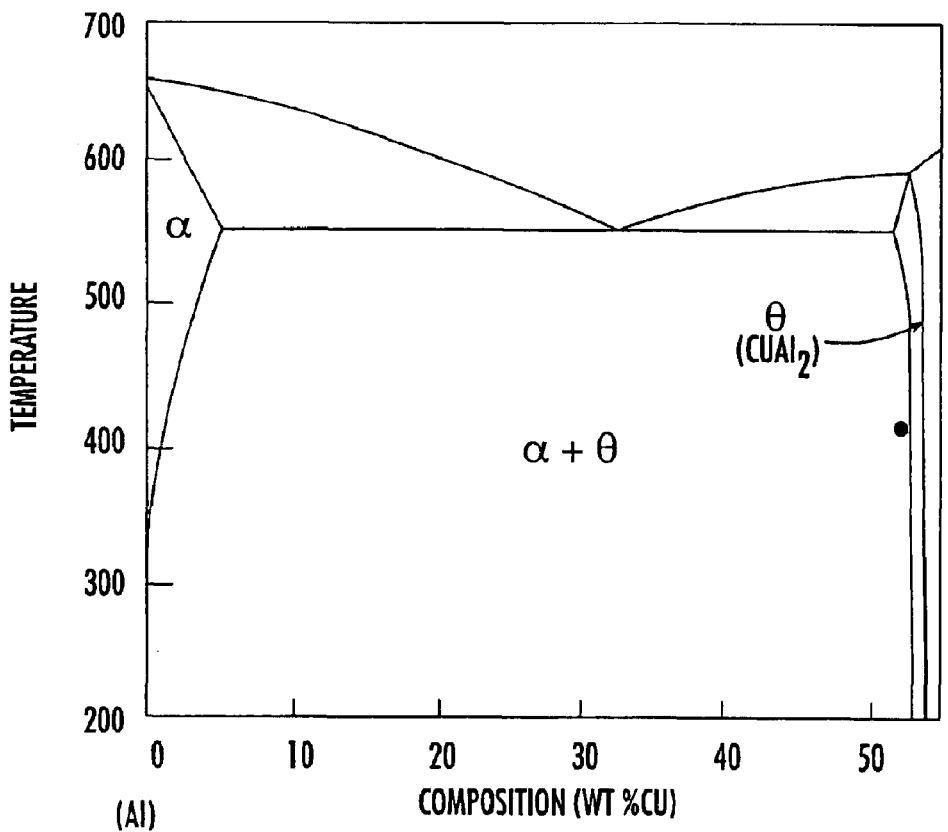
FIG. 18C is a phase diagram for an aluminum-copper metal alloy system.

Referring now to FIG. 18C, there is shown a binary system phase diagram for aluminum and copper adapted from *Metals Handbook: Metallography, Structures and Phase Diagrams*, Vol. 8, 8th edition, ASM Handbook Committee, T. Lyman Editor, American Society for Metals, 1973, p. 259, to further illustrate the solution heat treatment and precipitation heat treatment processes. From the diagram, the temperature range (previously designated $T_0$) to solution heat treat an aluminum-copper metal alloy having a known composition of wt % copper (previously designated $C_1$) so as to completely dissolve the copper atoms can be determined. The time period necessary to completely dissolve the copper atoms, previously designated $t_1$ hours, is dependent upon the material composition, $C_1$, and the temperature, $T_0$, and can be readily determined by those skilled in the art. Upon completing the solution heat treating, the resulting alloy has an incomplete temper and is in a nonequilibrium state. The precipitation heat treatment process is then conducted at a temperature range of approximately 100° C. to approximately 300° C. (previously designated $T_2$) for $t_2$ hours to complete the temper and stabilize the material properties. The time period, $t_2$, being dependent upon the material composition, $C_1$, and the temperature, $T_2$, and can be readily determined by those skilled in the art.

Grain growth can be controlled during the annealing and precipitation hardening processes by controlling thermal gradients within the material or by stretching the preform 26 past the critical strain limits that nucleate grain growth. In addition, it has been found that heating the workpiece 22, the die 16 and/or the pin or pins 28 before and/or during the mixing operation results in the preform 26 better retaining the refined grain structure during subsequent annealing or precipitation hardening. According to one embodiment, the workpiece 22, the die 16, and/or pin or pins 28 are heated to between about 600° F. and about 1000° F., and more preferably are heated to about 750° F. More preferably, the workpiece 22, the die 16, and/or pin or pins 28 are heated to about the solution heat treatment temperature of the material forming the workpiece. For purposes of example only and not limitation, the workpiece 22, die 16 and/or pin or pins 28 can be heated using electrical current, a resistance heating coil, an induction heating coil, a quartz lamp, a gas torch, or a laser. For example, the assignee of the present application has developed methods and apparatus for heating a friction stir welding probe, which is similar to the pins 28 of the present invention, as disclosed in commonly owned U.S. patent application Ser. No. 10/035,865 entitled "High Strength Friction Stir Welding" filed on Dec. 26, 2001, the entire disclosure of which is hereby incorporated by reference.

To control the temperature of the workpiece 22 during the operation of the apparatus 14 and, more preferably, to control the temperature of the workpiece so that the temperature does not exceed the solution heat treatment temperature of the material used to form the workpiece, the die 16 can be cooled. For example, the die 16 can include internal piping attached any of a number of cooling systems, as are known in the art, for supplying gaseous or liquid coolant to the die and for transporting heat away from the die.

According to one embodiment, as illustrated in FIG. 14, the apparatus 14 includes a temperature control unit 53 in electrical communication through suitable electrical or optical wiring 55 with a computer or microprocessor 33 operating under software control. The temperature control unit 53 is in electrical communication with a heating system 53a and cooling system 53b, as described above, through suitable electrical or optical wiring 53c. In turn, the heating system 53a and cooling system 53b are in thermal communication with the die 16, as illustrated in FIG. 14 by reference numerals 49 and 51, respectively. The die 16 can include one or more temperature sensors 41, such as a thermocouple, a thermometer, a resistance thermometer, a thermistor, a pyrometer, that is in electrical communication through suitable electrical or optical wiring 50 with temperature control unit 53.

As illustrated in FIG. 14, the apparatus 14 can include a cooling unit 59 attached directly to the die 16 for cooling the workpiece 22. For example, the cooling unit can include jets (not shown) for spraying gaseous or liquid coolant onto the preform 26 to thereby quench the preform. The apparatus 14 preferably includes an insulating block 47 between the cooling unit 59 and the die 16.

During operation of the apparatus 14, a workpiece 22 is positioned adjacent the first aperture 18a of the die 16. The power source 39 for the ram 37 is then engaged manually using a control panel (not shown) located on the power source 39 or using the computer 33, or alternatively, the computer 33 can be preprogrammed to automatically engage the power source. The ram 37 moves into contact with the workpiece 22 and begins to force the workpiece through the first aperture 18a and into the interior 20 of the die 16. As described above, the interior 20 of the die 16 can be structured to shape or form the workpiece 22, such as through a reduction in the cross-sectional area of the workpiece.

Upon engagement of the power source 39 for the ram 37, the motor or motors 32 connected to one or more threaded pins 28 that extend at least partially into the interior 20 of the die 16 are engaged. The motor or motors 32 can be engaged manually using a control panel (not shown) located on each motor or using the computer 33. Alternatively, the computer 33 can be preprogrammed to automatically engage the motor or motors 32 when engaging the power source 39 for the ram 37. As the ram 37 forces the workpiece 22 through the interior 20 of the die 16 from the first aperture 18a to the second aperture 18b, the rotation of the pin or pins 28 against and through the workpiece creates friction that generates sufficient heat energy to plasticize the workpiece proximate to the rotating pin or pins. The number of pins 28, as well as the spacing, configuration and orientation of the pins within the interior 20 of the die 16 will depend on the dimensions and configuration of the workpiece 22, and preferably is selected such that the entire workpiece is mixed or stirred by the pin or pins to avoid a "banded" grain pattern, i.e., bands of mixed workpiece material with gaps of unmixed material therebetween.

The workpiece 22, die 16 and/or the pin or pins 28 can be heated before and/or during the mixing operation. Preferably the temperature of the workpiece 22 within the die 16 is maintained at approximately the solution heat treatment temperature of the material forming the workpiece. According to one embodiment, the computer 33 engages the temperature control unit 53, including communicating to the temperature control unit the desired temperature of the workpiece 22, die 16, and/or pin or pins 28. The temperature control unit 53 periodically obtains temperature readings from the temperature sensors 41 and compares the temperature reading to the desired temperature communicated to the temperature control unit by the computer 33. If the temperature reading exceeds the desired temperature reading, then the temperature control unit 53 engages the cooling system 53b and disengages the heating system 53a. If the temperature reading is below the desired temperature reading, then the temperature control unit 53 engages the heating system 53a and disengages the cooling system 53b.

As the workpiece 22 passes the rotating pin or pins 28, the interior 20 of the die 16 preferably includes a chamber 58 adjacent the second aperture 18b that is structured to exert pressure on the workpiece 22 to re-consolidate the workpiece after the workpiece has been mixed by the pin or pins 28. Thereafter, the workpiece 22 cools to form a preform 26 having a refined grain structure, which preform exits the apparatus 14 through the second aperture 18b of the die 16. If desired, the preform 26 can undergo additional heat treatments to further improve the material properties of the preform. The preform 26 can then be machined, using known machining methods, into a structural member that can be connected to other structural members using fasteners or welding techniques to form a structural assembly, such as the frame of an aerospace vehicle.

Referring now to FIG. 19, there is illustrated the operations performed when operating on a workpiece, according to one embodiment of the present invention. The method of manufacturing includes moving a workpiece through a die. See block 61. Concurrently with the moving step, the workpiece is mixed with at least one rotating pin to thereby refine the grain structure of the workpiece. See block 62. In one embodiment, the workpiece is heated concurrently with the mixing step. See block 67. In another embodiment, the pin and/or die are heated concurrently with the mixing step. See block 68. Preferably, the pin and/or die are heated to the solution heat treatment temperature of the material used to form the workpiece. For example, the heating step can comprise heating the pin and/or die to a temperature between about 600° F. and about 1000° F. In another embodiment, the die is cooled concurrently with the mixing step. See block 69. In yet another embodiment, the mixing step comprises individually rotating a plurality of pins in corresponding first directions and collectively rotating the plurality of pins in a second direction. See block 63. In one embodiment, the corresponding first directions are the same as the second direction. See block 64. In another embodiment, the corresponding first directions are opposite to the second direction. See block 65. In still another embodiment, the corresponding first directions comprise rotating at least two of the pins in opposite directions. See block 66.

The material properties of the workpiece can be further developed through selective heat treating. In one embodiment, the workpiece is solution heat treated prior to the moving step. See block 60. In another embodiment, the workpiece is solution heat treated at a predetermined temperature schedule after the mixing step. See block 70. In yet another embodiment, the workpiece is precipitation heat treated by aging at a second predetermined temperature schedule after the solution heat treating step. See block 71.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for operating on a workpiece, comprising:
   a die defining first and second apertures and an interior therebetween, said first aperture and said interior of said die being structured to receive the workpiece; and
   at least one rotatable pin extending at least partially into said interior of said die, said at least one pin being structured to at least partially plasticize the workpiece through frictional heat as the workpiece moves through said interior of said die to thereby refine the grain structure of the workpiece.

2. An apparatus according to claim 1 further comprising a ram structured to urge the workpiece through said interior of said die from said first aperture to said second aperture.

3. An apparatus according to claim 1 wherein said die has first and second sides at least partially defining said interior, said at least one pin extending from said first side to said second side so as to traverse said interior of said die.

4. An apparatus according to claim 1 further comprising a plurality of rotatable pins extending at least partially into said interior of said die, each of said plurality of pins being structured to stir the workpiece as the workpiece moves through said interior of said die.

5. An apparatus according to claim 4 further comprising a rotatable turret, said plurality of pins being rotatably mounted to said turret, and wherein said turret is structured to individually rotate each of said plurality of pins in corresponding first directions and to collectively rotate said plurality of pins in a second direction.

6. An apparatus according to claim 5 wherein said corresponding first directions are the same as said second direction.

7. An apparatus according to claim 5 wherein said corresponding first directions are opposite to said second direction.

8. An apparatus according to claim 5 wherein said corresponding first directions comprise rotating at least two of said plurality of pins in opposite directions.

9. An apparatus according to claim 1 wherein said interior of said die defines a chamber adjacent said second aperture, said chamber being structured to consolidate the workpiece.

10. An apparatus according to claim 9 wherein said at least one rotatable pin extends into said interior between said first aperture and said chamber.

11. An apparatus according to claim 1 wherein said interior of said die is structured to shape the workpiece into a configuration selected from the group consisting of a square, a rectangle and a cylinder.

12. An apparatus for operating on a workpiece, comprising:
    at least one motor having a rotatable spindle;
    a die defining first and second apertures and in interior extending therebetween, said interior of said die being structured to form the workpiece; and
    at least one pin in rotatable communication with said spindle, said at least one pin extending at least partially into said interior of said die, said at least one pin being structured to at least partially plasticize the workpiece through frictional heat and to mix the workpiece as the workpiece moves through said interior to thereby refine the grain structure of the workpiece.

13. An apparatus according to claim 12 further comprising a ram structured to urge the workpiece through said interior of said die from said first aperture to said second aperture.

14. An apparatus according to claim 12 wherein said die has first and second sides at least partially defining said interior, said at least one pin extending from said first side to said second side so as to traverse said interior of said die.

15. An apparatus according to claim 12 further comprising:
    a plurality of motors each having a rotatable spindle; and
    a plurality of pins each being in rotatable communication with a corresponding one of said spindles, each of said plurality of pins extending at least partially into said interior of said die, said plurality of pins being structured to at least partially mix the workpiece as the workpiece moves through said interior of said die to thereby refine the grain structure of the workpiece.

16. An apparatus according to claim 12 further comprising:
    a rotatable turret, said turret being in rotatable communication with said spindle of said at least one motor; and
    a plurality of pins each being in rotatable communication with said turret, each of said plurality of pins extending at least partially into said interior of said die, said turret being structured to individually rotate each of said plurality of pins in corresponding first directions and to collectively rotate said plurality of pins in a second direction, and wherein said plurality of pins are structured to at least partially mix the workpiece as the workpiece moves through said interior of said die to thereby refine the grain structure of the workpiece.

17. An apparatus according to claim 16 wherein said corresponding first directions are the same as said second direction.

18. An apparatus according to claim 16 wherein said corresponding first directions are opposite to said second direction.

19. An apparatus according to claim 16 wherein said corresponding first directions comprise rotating at least two of said plurality of pins in opposite directions.

20. An apparatus according to claim 12 wherein said interior of said die is structured to shape the workpiece into a configuration selected from the group consisting of a square, a rectangle and a cylinder.

* * * * *